US009335810B2

(12) United States Patent
Nakai

(10) Patent No.: US 9,335,810 B2
(45) Date of Patent: May 10, 2016

(54) POWER MANAGEMENT SYSTEM, IMAGE PROCESSING APPARATUS, CONTROL METHODS THEREFOR AND STORAGE MEDIUM

(71) Applicant: CANON KABUSHIKI KAISHA, Tokyo (JP)

(72) Inventor: Hironobu Nakai, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/537,061

(22) Filed: Nov. 10, 2014

(65) Prior Publication Data

US 2015/0153808 A1 Jun. 4, 2015

(30) Foreign Application Priority Data

Nov. 29, 2013 (JP) ................................. 2013-248335

(51) Int. Cl.
*G06K 15/00* (2006.01)
*G06F 1/32* (2006.01)
*H04N 1/00* (2006.01)
*G06F 11/30* (2006.01)

(52) U.S. Cl.
CPC ............ *G06F 1/3209* (2013.01); *G06F 1/3215* (2013.01); *G06F 11/3062* (2013.01); *H04N 1/00891* (2013.01); *H04N 1/00896* (2013.01); *G06F 2201/87* (2013.01)

(58) Field of Classification Search
None
See application file for complete search history.

(56) References Cited

U.S. PATENT DOCUMENTS

| 2012/0042179 A1* | 2/2012 | Tamura .......................... 713/300 |
| 2012/0200883 A1* | 8/2012 | Ikari ............................ 358/1.15 |
| 2013/0083340 A1* | 4/2013 | Asai ............................. 358/1.13 |
| 2013/0120780 A1 | 5/2013 | Hamada |

FOREIGN PATENT DOCUMENTS

| JP | 2003-032397 A | 1/2003 |
| JP | 2006-227061 A | 8/2006 |
| JP | 2006-227691 A | 8/2006 |
| JP | 2008-259087 A | 10/2008 |

OTHER PUBLICATIONS

Apr. 10, 2015 European Search Report in European Patent Application No. 14003817.5.

* cited by examiner

*Primary Examiner* — John Wallace
(74) *Attorney, Agent, or Firm* — Fitzpatrick, Cella, Harper & Scinto

(57) ABSTRACT

Each of a plurality of image processing apparatuses notifies a management server that maintenance is to be executed. Upon receiving a response, the image processing apparatus disconnects communication to start maintenance. Upon the end of the maintenance, the image processing apparatus establishes communication to notify the management server of completion of the maintenance. The management server calculates the power consumption of the plurality of image processing apparatuses including a maintenance target apparatus so as not to be higher than preset total power by assuming that the maintenance target apparatus is operated at the maximum power consumption of the image processing apparatus. The management server sends, to the maintenance target apparatus, a permission notification for permitting the maintenance target apparatus to execute the maintenance, as a response to the notification.

17 Claims, 12 Drawing Sheets

F I G. 4
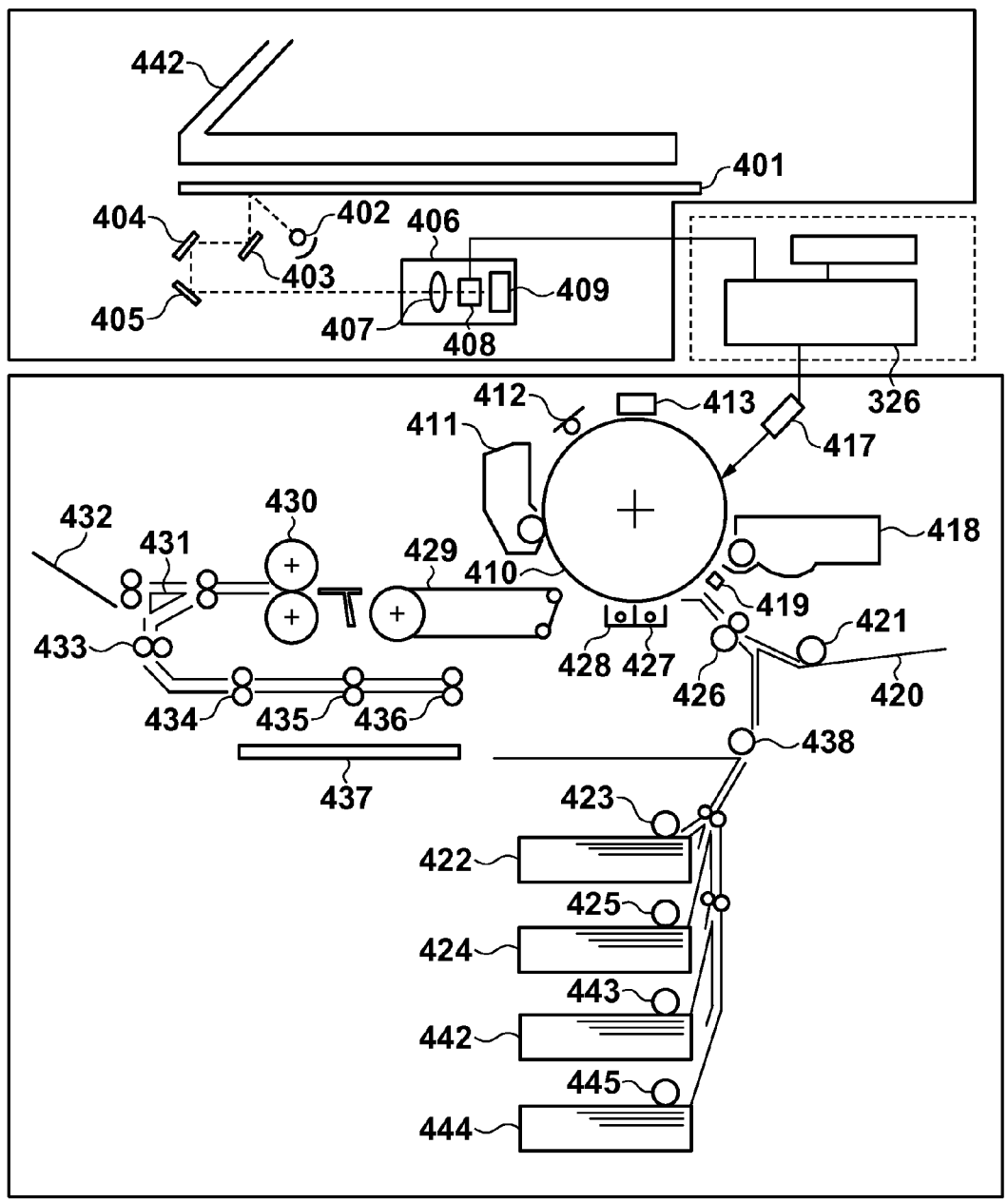

FIG. 6

| APPARATUS | APPARATUS STATE | MAXIMUM POWER CONSUMPTION | |
|---|---|---|---|
| A | MAINTENANCE STATE | EQUIVALENT TO 950W | ~605 |
| B | NORMAL STATE | 950W | |
| C | NORMAL STATE | 150W | |
| D | NORMAL STATE | 150W | |
| E | NORMAL STATE | 800W | |
| | | TOTAL: 3000W | ~606 |

601: APPARATUS
602: APPARATUS STATE
604
603: MAXIMUM POWER CONSUMPTION

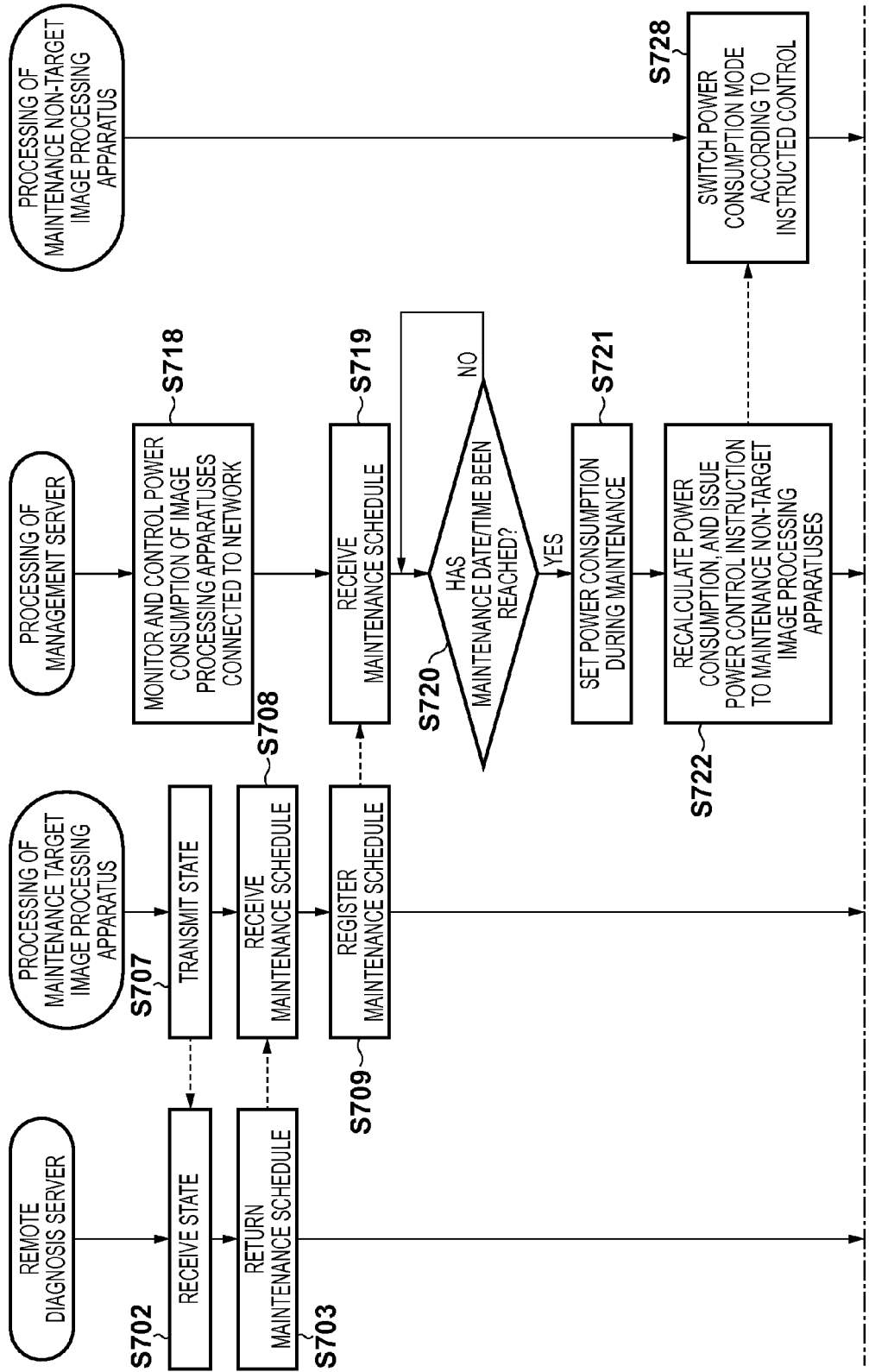

FIG. 8A

801 — DEVICE NUMBER  SN : ABC1234567
802 — VISIT DATE  2012/10/11
804 — ENERGIZED POINT  OPERATION TIME 10:00-12:00 — 803
805 — USED POWER

| | | 808 | | | | | | 809 |
|---|---|---|---|---|---|---|---|---|
| 806 MAINTENANCE ITEM | 807 ADJUSTMENT ITEM THIS TIME | PRESENCE/ABSENCE OF SIMULTANEOUS OPERATION | PRINTER 1000W | SCANNER 200W | DECK 50W | FINISHER 100W | FEEDER 20W | FAX 10W | MAXIMUM POWER (W) |
| ADJUSTMENT A | ○ | ABSENCE | ○ | × | × | × | × | × | 1000 |
| ADJUSTMENT B | ○ | ABSENCE | ○ | ○ | × | × | × | × | 1000 |
| ADJUSTMENT C | ○ | PRESENCE | ○ | × | ○ | × | × | × | 1050 |
| ADJUSTMENT D | × | PRESENCE | ○ | ○ | ○ | ○ | × | × | 1150 |
| ADJUSTMENT E | × | PRESENCE | ○ | ○ | × | × | ○ | × | 1370 |
| ADJUSTMENT F | × | PRESENCE | × | ○ | × | × | ○ | ○ | 230 |
| ... | ... | ... | ... | ... | ... | ... | ... | ... | ... |

DEVICE NUMBER SN : XYZ9876543
VISIT DATE 2012/10/11
OPERATION TIME 12:30-14:00

| MAINTENANCE ITEM | ADJUSTMENT ITEM THIS TIME | ENERGIZED POINT | | | | | | |
|---|---|---|---|---|---|---|---|---|
| | | PRINTER 500W | SCANNER 100W | DECK | FINISHER | FEEDER 10W | FAX 10W | MAXIMUM POWER (W) |
| | | USED POWER | | | | | | |
| | | PRESENCE/ABSENCE OF SIMULTANEOUS OPERATION | | | | | | |
| ADJUSTMENT A | ○ | ○ | × | N/A | N/A | × | × | 500 |
| ADJUSTMENT B | ○ | ○ | ○ | N/A | N/A | × | × | 600 |
| ADJUSTMENT C | ○ | ○ | × | N/A | N/A | × | × | 500 |
| ADJUSTMENT D | × | ○ | ○ | N/A | N/A | × | × | 500 |
| ADJUSTMENT E | × | × | ○ | N/A | N/A | ○ | × | 610 |
| ADJUSTMENT F | × | × | ○ (absence... presence) | N/A | N/A | ○ | ○ | 120 |

810 ratuses comprising a notification unit configured to notify the management server that maintenance is to be executed, and an execution unit configured to, upon receiving a response to the notification by the notification unit from the management server, disconnect communication to start maintenance, and upon an end of the maintenance, establish communication to notify the management server of completion of the maintenance, and the management server comprising a calculation unit configured to calculate, according to the notification by the notification unit, the power consumption of the plurality of image processing apparatuses including a maintenance target image processing apparatus so as not to be higher than preset total power by assuming that the maintenance target image processing apparatus is operated at maximum power consumption of the image processing apparatus, and a control unit configured to notify a maintenance non-target image processing apparatus of a calculation result of the calculation unit, and upon receiving, from the maintenance non-target image processing apparatus, a notification that the maintenance non-target image processing apparatus has transited to power control according to the calculation result, send, to the maintenance target image processing apparatus, a permission notification for permitting the maintenance target image processing apparatus to execute the maintenance, as a response to the notification by the notification unit.

POWER MANAGEMENT SYSTEM, IMAGE PROCESSING APPARATUS, CONTROL METHODS THEREFOR AND STORAGE MEDIUM

BACKGROUND OF THE INVENTION

1. Field of the Invention

The present invention relates to a power management system including an image processing apparatus to be maintained, an image processing apparatus, control methods for the power management system and the image processing apparatus, and a storage medium.

2. Description of the Related Art

Along with the recent increase in consciousness about environment and energy, an attempt has been widely made to control optimization of power consumption by providing a power meter in various electronic devices, and collecting information measured by the power meter via a wired or wireless LAN (Local Area Network). Since devices such as a printer and multi-function peripheral installed in an office need to thermally fix a toner image on a paper sheet, they are classified into a group whose power usage is relatively large among electronic devices. Japanese Patent Laid-Open Nos. 2003-32397 and 2006-227691 propose techniques of monitoring the use statuses of a plurality of image processing apparatuses connected to a network, measuring the total power consumption of the plurality of apparatuses, and switching the apparatuses to a power-saving mode according to the upper limit power consumption.

However, the above conventional techniques have the following problem. For example, the above conventional techniques are control methods based on the premise that a device is connected to a network, and a management server connected to the network can grasp the power state of the device and switch the power mode of the device. On the other hand, when service maintenance (part replacement, device adjustment, cleaning, and the like) is performed for an image processing apparatus, maintenance may be executed after disconnecting a LAN cable or telephone line to prevent the device from unexpectedly operating by, for example, receiving a job from the network.

There is also a demand for operating a device without any trouble during normal business time by performing service maintenance during the time when the normal operation of the device is stopped, such as the time when planned power outage is scheduled or the time when the use of power is significantly restricted. In the above conventional technique, however, a power management system cannot grasp the power state of the device or send an instruction to suppress power while the LAN cable is disconnected. The main power of the device may be turned on as part of maintenance work to, for example, check the operation after part replacement, and may be fully energized suddenly. In this case, the restricted used power may be exceeded.

SUMMARY OF THE INVENTION

The present invention enables realization of a mechanism of managing power consumption predicted in a system even during service maintenance, thereby preventing the upper limit of restricted used power from being exceeded.

One aspect of the present invention provides a power management system including a plurality of image processing apparatuses and a management server configured to manage power consumption of the plurality of image processing apparatuses, each of the plurality of image processing appa- Another aspect of the present invention provides an image processing apparatus communicable with a management server configured to manage power consumption of a connected device, comprising: a notification unit configured to notify the management server that maintenance is to be executed; and an execution unit configured to, upon receiving a response to the notification by the notification unit from the management server, disconnect communication to start maintenance, and upon end of the maintenance, establish communication to notify the management server of completion of the maintenance.

Still another aspect of the present invention provides a management server for managing power consumption of a plurality of image processing apparatuses, comprising: a calculation unit configured to calculate, according to a notification that maintenance is to be executed from one of the plurality of image processing apparatuses, the power consumption of the plurality of image processing apparatuses including a maintenance target image processing apparatus so as not to be higher than preset total power by assuming that the maintenance target image processing apparatus is operated at maximum power consumption of the image processing apparatus; and a control unit configured to notify a maintenance non-target image processing apparatus of a calculation result of the calculation unit, and upon receiving, from the maintenance non-target image processing apparatus, a notification that the maintenance non-target image processing apparatus has transited to power control according to the calculation result, send to the maintenance target image processing apparatus, a permission notification for permitting the maintenance target image processing apparatus to execute the maintenance, as a response to the notification.

Yet still another aspect of the present invention provides a control method for a power management system including a plurality of image processing apparatuses and a management server configured to manage power consumption of the plurality of image processing apparatuses, each of the plurality of image processing apparatuses executing causing a notification unit to notify the management server that maintenance is to be executed, and causing an execution unit to, upon receiving a response in the causing the notification unit from the management server, disconnect communication to start maintenance, and upon end of the maintenance, establish communication to notify the management server of completion of the maintenance, and the management server executing calculating, according to the notification in the causing the notification unit, the power consumption of the plurality of image processing apparatuses including a maintenance target image processing apparatus so as not to be higher than preset total power by assuming that the maintenance target image processing apparatus is operated at maximum power consumption of the image processing apparatus, and notifying a maintenance non-target image processing apparatus of a calculation result in the calculating, and upon receiving, from the maintenance non-target image processing apparatus, a notification that the maintenance non-target image processing apparatus has transited to power control according to the calculation result, sending, to the maintenance target image processing apparatus, a permission notification for permitting the maintenance target image processing apparatus to execute the maintenance, as a response to the notification.

Still yet another aspect of the present invention provides a control method for an image processing apparatus communicable with a management server configured to manage power consumption of a connected device, comprising: notifying the management server that maintenance is to be executed; and disconnecting, upon receiving a response to the notification in the notifying from the management server, communication to start maintenance, and establishing, upon end of the maintenance, communication to notify the management server of completion of the maintenance.

Yet still another aspect of the present invention provides a control method for a management server configured to manage power consumption of a plurality of image processing apparatuses, comprising: calculating, according to a notification that maintenance is to be executed from one of the plurality of image processing apparatuses, the power consumption of the plurality of image processing apparatuses including a maintenance target image processing apparatus so as not to be higher than preset total power by assuming that the maintenance target image processing apparatus is operated at maximum power consumption of the image processing apparatus; and notifying a maintenance non-target image processing apparatus of a calculation result in the calculating, and upon receiving, from the maintenance non-target image processing apparatus, a notification that the maintenance non-target image processing apparatus has transited to power control according to the calculation result, sending, to the maintenance target image processing apparatus, a permission notification for permitting the maintenance target image processing apparatus to execute the maintenance, as a response to the notification.

Still yet another aspect of the present invention provides a non-transitory computer-readable storage medium storing a computer program for causing a computer to function as the image processing apparatus.

Yet still another aspect of the present invention provides a non-transitory computer-readable storage medium storing a computer program for causing a computer to function as the management server.

Further features of the present invention will become apparent from the following description of exemplary embodiments with reference to the attached drawings.

BRIEF DESCRIPTION OF THE DRAWINGS

FIG. 4 is a view showing the internal arrangement of the image processing apparatus according to the present invention;

FIG. 6 is a table showing an example of a power control table in a power management server according to the first embodiment;

FIGS. 7A and 7B are flowcharts of a processing system according to the second embodiment;

FIGS. 8A and 8B are tables showing an example of a maintenance reservation information table according to the second embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<System Configuration>

Figure 1:
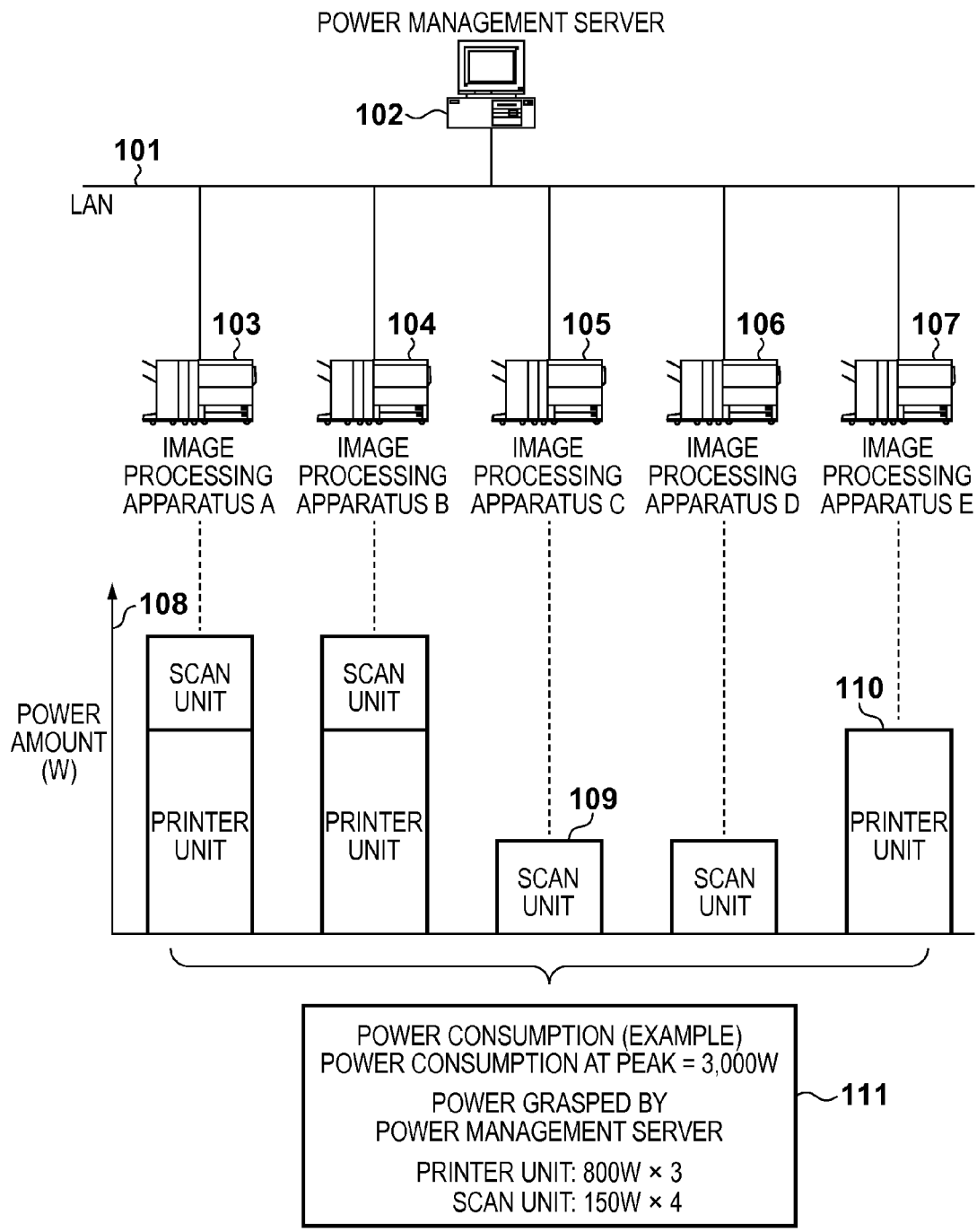
FIG. 1 is schematic view 1 showing the configuration of a power management system according to the present invention.
Figure 2:
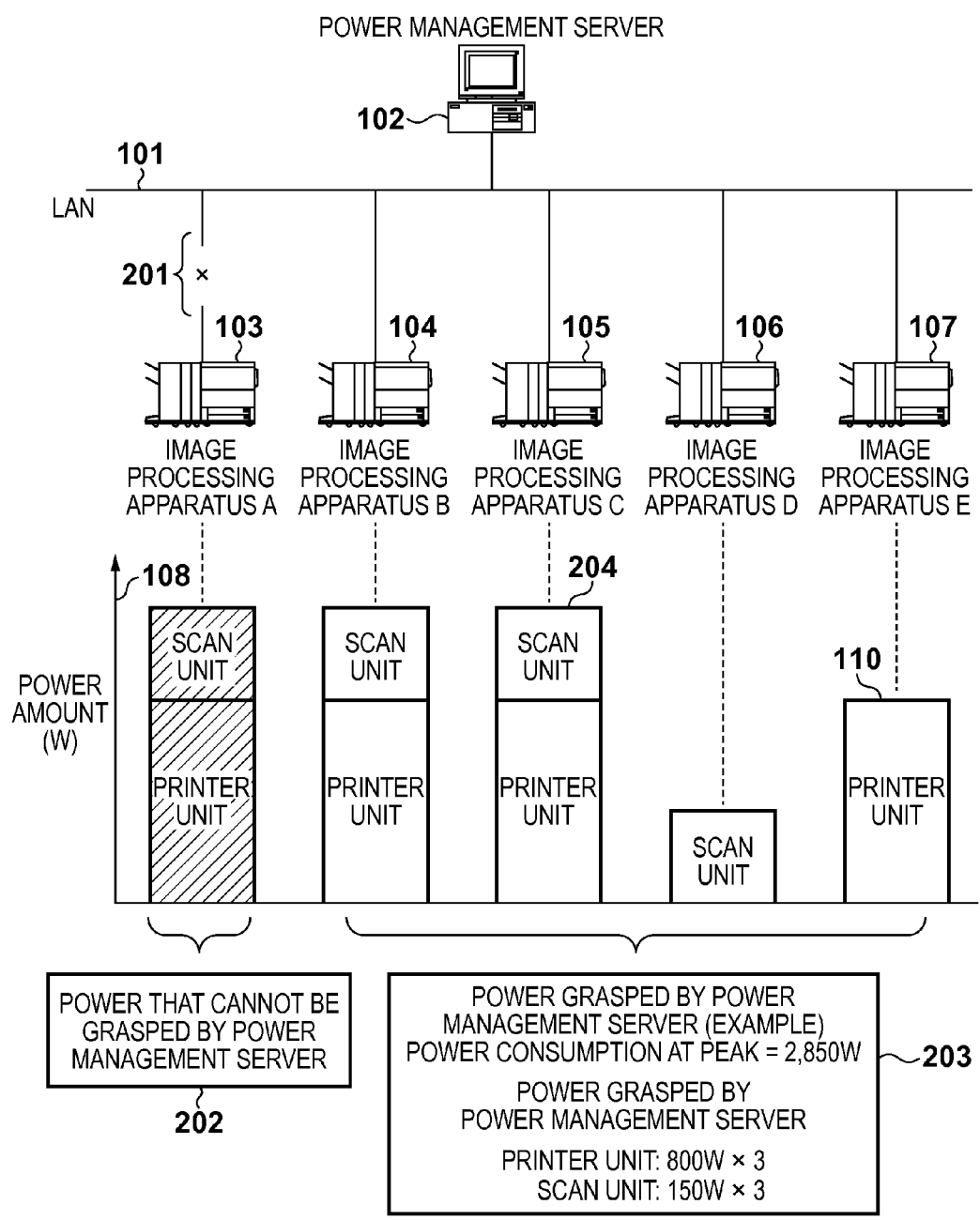
FIG. 2 is schematic view 2 showing the configuration of the power management system according to the present invention.

The first embodiment of the present invention will be described below with reference to FIGS. 1 to 6. FIGS. 1 and 2 each show an example of the configuration of a power management system according to the first embodiment of the present invention. Note that although not shown, there are a plurality of host PCs each for submitting a normal print job in one power management system. A power management server 102 is an example of an information processing apparatus, and comprises a so-called controller including a CPU, RAM, and ROM, a display device, an input device, and a storage device.

The power management server 102 activates predetermined applications under a predetermined OS, and performs various kinds of data processing. Furthermore, in the power management server 102, a driver for outputting data created by the above data processing to an image processing apparatus (to be described later), a driver for activating a scanner, and the like are installed in advance in an external storage device. A processing system in the power management server 102 performs processing as one of the predetermined applications. The power management server 102 also includes a communication module for communicating with a device on a network by a predetermined protocol (for example, TCP/IP, UDP/IP, IPX, or the like).

Referring to FIGS. 1 and 2, reference numerals 103 to 107 denote image processing apparatuses. Each of the image processing apparatuses 103 to 107 includes a main controller unit, an operation unit serving as a user interface, a scan unit serving as an image input device, a printer unit serving as an image output device, and a communication function, and performs various kinds of image input/output processing. The power management server 102 and the image processing apparatuses 103 to 107 are connected via a LAN (Local Area Network) 101 to be communicable using a predetermined protocol.

Reference numeral 108 denotes power consumption (W: watt). Each bar indicates the power consumption state of an image processing apparatus associated with the bar by a broken line. Reference numeral 109 denotes power consumption when the scan unit of the image processing apparatus 105 operates; 110, power consumption when the printer unit of the image processing apparatus 107 operates; and 111, an example of used power grasped by the power management server 102 based on the operation statuses of the plurality of image processing apparatuses 103 to 107 in the exemplified state, and power consumption allowed at peak. In FIG. 1, the power consumption at peak is 3,000 W, and the subtotal power consumption of the respective printer units and that of the respective scan units are also shown.

FIG. 2 shows a state in which the connection of the LAN 101 is disconnected, as denoted by reference numeral 201, in the state shown in FIG. 1 so that the image processing apparatus 103 executes maintenance. As denoted by reference numeral 202, the power management server 102 cannot grasp the power consumption state of the image processing apparatus 103 since communication is interrupted. As a result, when the printer unit and the scan unit are simultaneously operated as a maintenance work item, a total power of 950 W obtained by adding 800 W of the printer unit and 150 W of the scan unit cannot be grasped. Under the above-described situation, if power consumption allowed at peak is allocated to only the maintenance non-target image processing apparatuses 104 to 107, the power management server 102 may manage a total power consumption of 2,850 W, as denoted by reference numeral 203. In this example, as denoted by reference numeral 204, the image processing apparatus 105 is allowed to drive the printer unit. As a result, in consideration of the power consumption of the image processing apparatus 103 in the case exemplified in FIG. 2, the actual power consumption is 950 W (the image processing apparatus 103)+2, 850 W=3,800 W which exceeds the power consumption allowed at peak. A method of solving such problem will be explained below.

<Image Processing Apparatus/Controller Unit>

Figure 3:
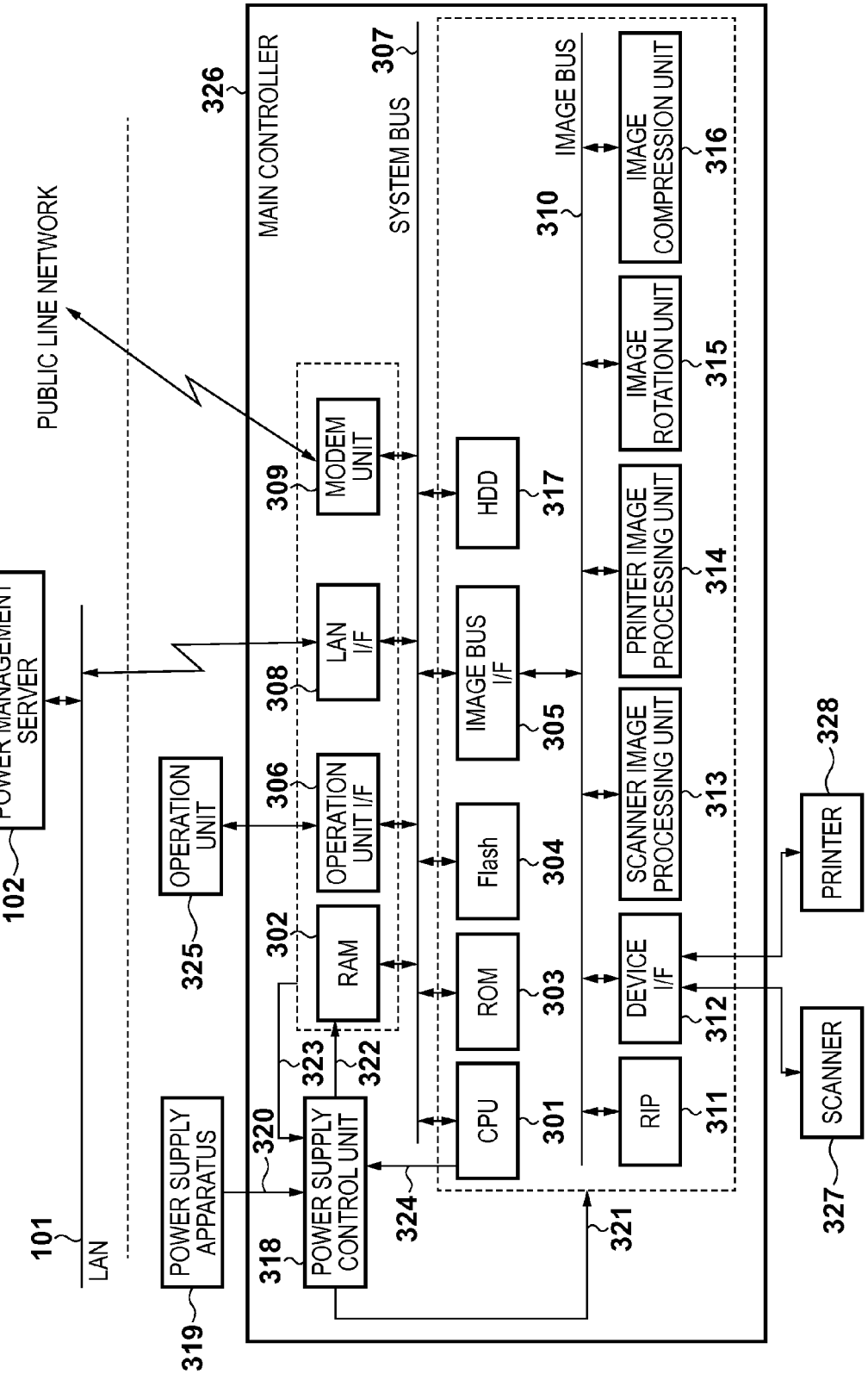
FIG. 3 is a block diagram showing the arrangement of the main controller of an image processing apparatus according to the present invention.

The arrangement of the main controller unit of the image processing apparatus 103 according to this embodiment will be described with reference to FIG. 3. A main controller 326 for controlling the overall image processing apparatus is connected to the LAN 101 and a public line network while controlling a scanner 327 and a printer 328. The main controller 326 inputs/outputs image information, state and information of the image processing apparatus, a file, and the like to/from an external device via the LAN 101 or public line network. The main controller 326 includes a CPU (Central Processing Unit) 301 serving as a main control unit.

The CPU 301 is connected to a RAM (Random Access Memory) 302, a ROM (Read Only Memory) 303, and a flash memory 304 via a system bus 307. The CPU 301 is also connected to an image bus I/F 305, an operation unit I/F 306, a LAN I/F 308, and a modem unit 309. The RAM 302 is a memory that is readable and writable, as needed, and is used to provide a work area for the CPU 301. The RAM 302 is used as an image memory for temporarily storing image data. The ROM 303 is a boot ROM, and stores the boot program of the system. The flash memory 304 is a non-volatile memory, and stores system software, setting value data, and the like which need to be held even after power-off of the image processing apparatus 103.

The operation unit I/F 306 is an interface that inputs/outputs data to/from an operation unit 325. The operation unit I/F 306 is used to output drawing data to be displayed to the operation unit 325, and transmit, to the CPU 301, information input by the user via the operation unit 325. The LAN I/F 308 is an interface that connects to the LAN 101, and inputs/outputs information to/from the LAN 101.

The modem unit 309 is an interface that connects to the public line network, and inputs/outputs information to/from the public line network. The image bus I/F 305 is an interface that connects the system bus 307 and an image bus 310 for transferring image data at high speed, and operates as a bus bridge for converting a data structure. A RIP (Raster Image Processor) 311, a device I/F 312, a scanner image processing unit 313, a printer image processing unit 314, an image rotation unit 315, and an image compression unit 316 are connected to the image bus 310. The RIP 311 rasterizes PDL (Page Description Language) data received from the LAN 101 into a bitmap image.

The device I/F 312 is an interface that connects the main controller 326 to the scanner 327 and printer 328, and performs synchronous system/asynchronous system conversion of image data. The scanner image processing unit 313 performs processing such as correction, modification, and editing for input image data read by the scanner 327. The printer image processing unit 314 performs processing such as color conversion, filter processing, and resolution conversion for print output image data to be output to the printer 328. The image rotation unit 315 rotates image data. The image compression unit 316 performs JPEG compression/decompression processing for multi-valued image data, and JBIG, MMR, or MH compression/decompression processing for binary image data. An HDD (Hard Disk Drive) 317 is a nonvolatile data storage device, and holds various data such as image data, address book data, job log, and user-specific data. Note that if the main controller 326 is configured not to connect the HDD 317, the above-described various data are held in the flash memory 304.

A power supply control unit 318 supplies, to predetermined circuit elements of the main controller 326 via power supply lines 321 and 322, DC power received, via a power supply line 320, from a power supply apparatus 319 for supplying power. The power supply control unit 318 controls power supply of the power supply lines 321 and 322 based on a control signal received from the LAN I/F 308 via a control signal line 323 and a control signal received from the CPU 301 via a control signal line 324. The power supply line 321 is connected to the CPU 301, ROM 303, flash memory 304, image bus I/F 305, and HDD 317. The power supply line 321 is also connected to the RIP 311, device I/F 312, scanner image processing unit 313, printer image processing unit 314, image rotation unit 315, and image compression unit 316. The power supply line 322 is connected to the RAM 302, operation unit I/F 306, LAN I/F 308, and modem unit 309.

<Image Processing Apparatus/Internal Arrangement>

The internal arrangement of each of the image processing apparatuses 103 to 107 according to the present invention will be described with reference to FIG. 4. Based on an instruction accepted from the user via a host PC (not shown) or the operation unit 325, the main controller 326 controls the scanner 327 and printer 328 to read a document and perform printing on a paper sheet. The schematic operations of scan processing by the scanner 327 and print processing by the printer 328 will be sequentially explained with reference to FIG. 4.

In the scan processing, an automatic document conveyance device 442 sequentially conveys documents placed by the user to a platen glass 401. A document illumination lamp 402 is a lamp for illuminating a document, which is implemented by, for example, a halogen lamp, and exposes a document placed on the platen glass 401. Scanning mirrors 403, 404, and 405 are accommodated by an optical scanning unit (not shown), and guide light reflected by the document to a CCD unit 406. The CCD unit 406 includes an imaging lens 407 for imaging light reflected by the document on a CCD (Charge Coupled Device) image sensor 408, and a CCD driver 409 for driving the CCD image sensor 408. The document is read when an image signal output from the CCD image sensor 408 is converted into, for example, 8-bit digital data, and input to the main controller 326 as image data.

In the print processing, a pre-exposure lamp 412 removes charges from a photosensitive drum 410 for image formation. A primary charger 413 uniformly charges the photosensitive drum 410. An exposure unit 417 includes, for example, a semiconductor laser, and forms an electrostatic latent image by exposing the photosensitive drum 410 based on the image data processed by the main controller 326. A developing unit 418 contains toner of a developing material. A pre-transfer charger 419 exerts high pressure before transferring a toner image developed on the photosensitive drum 410 to a paper sheet.

Paper feed units 420, 422, 424, 442, and 444 (the paper feed unit 420 is a manual paper feed unit) are units for feeding paper sheets. Each paper feed unit conveys a paper sheet to the apparatus by driving a corresponding one of paper feed rollers 421, 423, 425, 443, and 445. The paper sheet conveyed from each of the paper feed units 420, 422, 424, 442, and 444 temporarily stops at the arrangement position of registration rollers 426, and is then re-conveyed in synchronism with the write timing of the image formed on the photosensitive drum 410. A transfer charger 427 transfers the toner image developed on the photosensitive drum 410 to the conveyed paper sheet. A separation charger 428 separates, from the photosensitive drum 410, the paper sheet for which the transfer operation has ended. A cleaner 411 collects the toner remaining on the photosensitive drum 410 without being transferred. A conveyance belt 429 conveys, to a fixing unit 430, the paper sheet for which the transfer process has ended.

The fixing unit 430 is heated by a heater (not shown), and fixes the toner on the paper sheet by heat. A flapper 431 controls the conveyance path of the paper sheet for which the fixing process has ended to the arrangement position of a discharge tray 432 or an intermediate tray 437. Conveyance rollers 433, 434, 435, and 436 convey, to the intermediate tray 437, the paper sheet for which the fixing process has ended once by reversing (multiple) or without reversing (double-sided) the paper sheet. A re-conveyance roller 438 re-conveys the paper sheet placed on the intermediate tray 437 to the arrangement position of the registration rollers 426. Printing on the paper sheet is completed when the printed paper sheet is discharged onto the discharge tray 432 by the above-described image forming processing.

<Image Processing Apparatus/Power Operation Mode>

The power operation mode of the image processing apparatus will be described with reference to FIG. 3. Each of the image processing apparatuses 103 to 107 has two power modes roughly classified into a normal power mode and power-saving mode whose power states are different from each other in accordance with the operation state of the apparatus. In either the normal power mode or the power-saving mode, the power supply apparatus 319 supplies power to the power supply control unit 318 via the power supply line 320. In the normal power mode, the CPU 301 controls the power supply control unit 318 to enable power supply to the power supply lines 321 and 322. With this processing, in the normal power mode, the power supply apparatus 319 supplies power to both the CPU 301 and the LAN I/F 308.

On the other hand, in the power-saving mode, the CPU 301 controls the power supply control unit 318 to disable power supply to the power supply line 321 and enable power supply to the power supply line 322. At this time, power supply to main circuit elements including the CPU 301 of the main controller 326 is interrupted. As a result, in the power-saving mode, it is possible to significantly reduce the power consumption of the image processing apparatuses 103 to 107, as compared with the normal power mode.

When the LAN I/F 308 receives data such as a print job from the host PC (not shown) on the LAN 101, it controls the power supply control unit 318 to return from the power-saving mode to the normal power mode. In the power-saving mode, since the power supply apparatus 319 supplies power to the RAM 302, the RAM 302 enters a low power consumption state while backing up a system program by a self-refresh operation. Data can be input/output between the LAN I/F 308 and the RAM 302 by DMA (Direct Memory Access) transfer using a DMA control unit (not shown) included in the LAN I/F 308. Note that in the power-saving mode, power supply to the CPU 301 is interrupted. The present invention, however, is not limited to this. For example, in another embodiment, a state in which power supply to the CPU 301 is reduced as compared with the normal power mode to decrease the operating frequency of the CPU 301 may be set as a power-saving mode. Note that in the normal power mode as well, when the operation of the scanner 327 or printer 328 is not necessary, it is possible to suppress power received by the scanner 327 or printer 328 via the device I/F 312 in response to an instruction from the CPU 301, thereby suppressing unnecessary power consumption.

<Operation Mode Change Control>

Figure 5A:
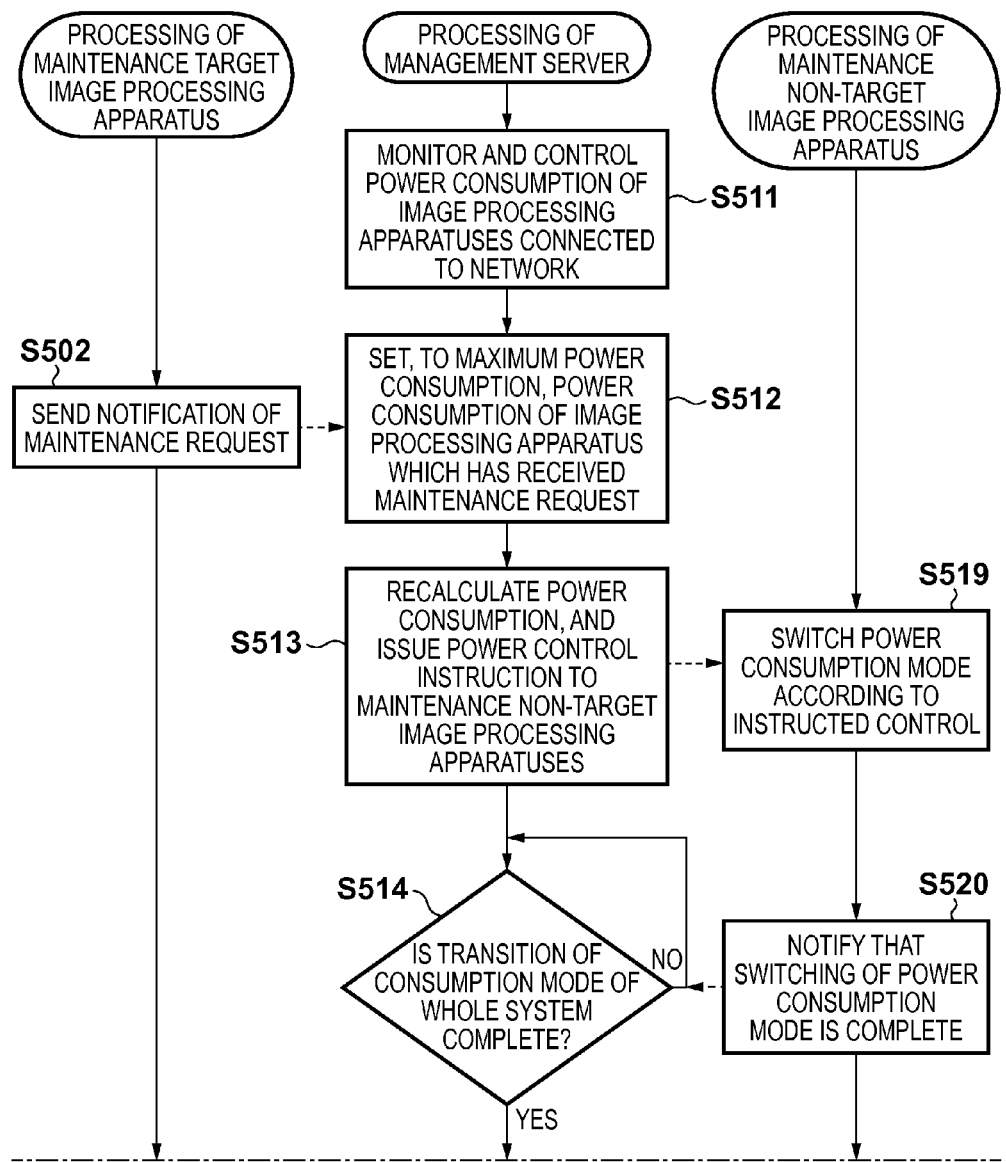
FIGS. 5A and 5B are flowcharts of the power management system according to the first embodiment.
Figure 5B:
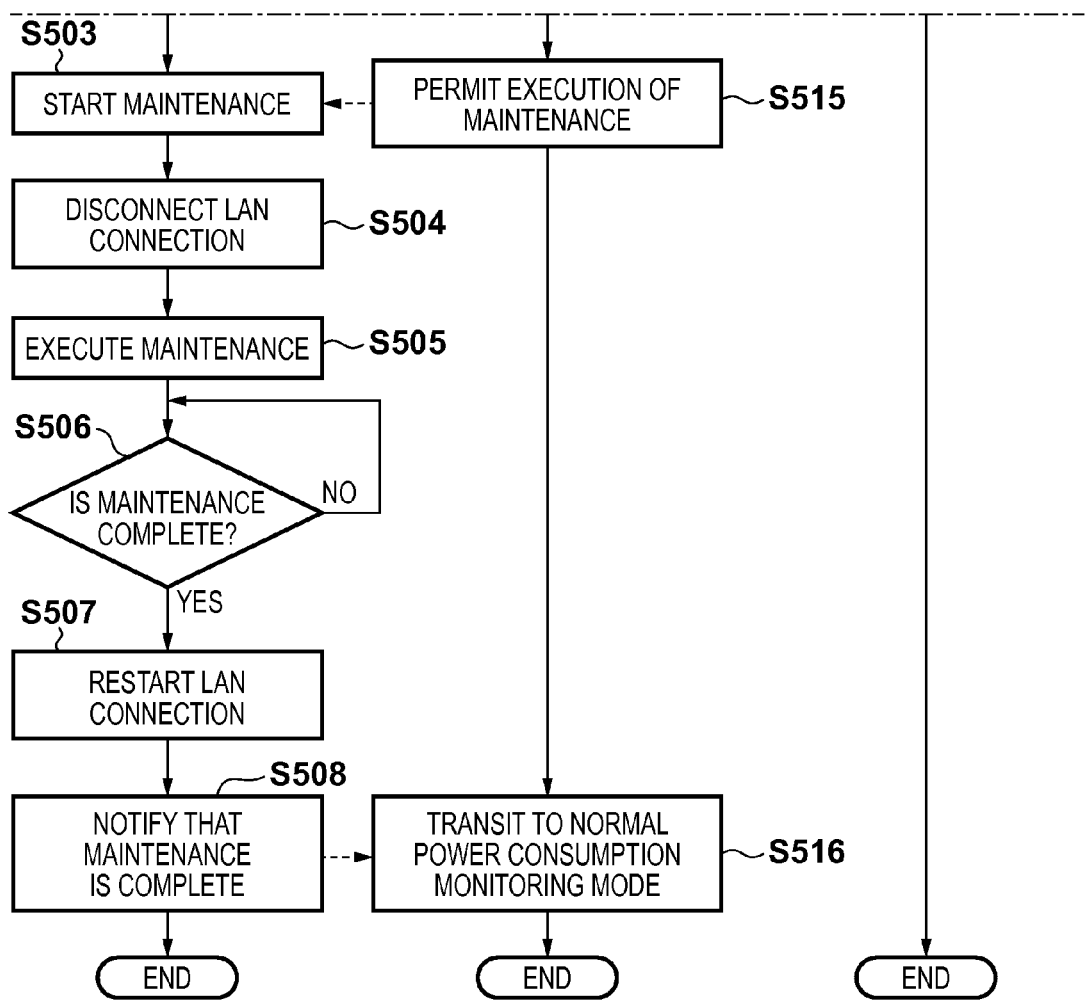

Processing contents of the power management server 102 and each of the maintenance non-target image processing apparatuses 104 to 107 at the time of execution of maintenance of the image processing apparatus 103 according to this embodiment will be described with reference to FIGS. 5A and 5B. This flowchart is implemented when the CPU 301 of the main controller 326 controls the printer 328 and scanner 327 via the power supply control unit 318 and device I/F 312 according to programs stored in the ROM 303. The processing system of the power management server 102 performs processing as one of the predetermined applications of the power management server.

In step S511, the power management server 102 monitors the power consumption of the plurality of power management target image processing apparatuses connected to the LAN 101, and starts and executes control processing so that the power consumption becomes equal to or lower than preset total power. On the other hand, in step S502, the maintenance target image processing apparatus 103 notifies the main controller 326 of a maintenance request accepted from the maintenance executor via the operation unit 325. Upon receiving the notification, the main controller 326 notifies the power management server 102 of the maintenance request via the LAN I/F 308.

In step S512, upon accepting the maintenance request from the image processing apparatus 103 via the LAN 101, the power management server 102 recognizes a state in which the image processing apparatus 103 that has received the maintenance request is operated by setting its power consumption to the maximum power consumption. In step S513, based on the recognition in step S512, the power management server 102 recalculates the power consumption of the management target image processing apparatuses 103 to 107. Based on the recalculation result, the power management server 102 issues a power control instruction to the image processing apparatuses 104 to 107 that are not maintenance targets but power management targets so that the power consumption of the image processing apparatuses including the image processing apparatus 103 becomes equal to or lower than the preset total power.

On the other hand, in step S519, upon receiving the power control instruction issued in step S513, each of the maintenance non-target image processing apparatuses 104 to 107 performs processing of switching the power consumption mode of its own to execute driving at the instructed power consumption or lower. Each of the image processing apparatuses 104 to 107 may display, on the operation unit 325, information indicating that the power control is performed for maintenance of the maintenance target image processing apparatus 103. In step S520, each of the maintenance non-target image processing apparatuses 104 to 107 notifies the power management server 102 that switching of the power consumption mode is complete. After that, each of the maintenance non-target image processing apparatuses 104 to 107 ends the process.

In step S514, the power management server 102 stands by for the power consumption mode switching completion notification, based on the power control instruction issued in step S513, of each of the maintenance non-target image processing apparatuses 104 to 107. Upon completion of transition of the power consumption mode of the whole system, the power management server 102 advances to step S515. In step S515, the power management server 102 sends a maintenance execution permission notification to the maintenance target image processing apparatus 103.

In step S503, upon receiving the maintenance execution permission notification from the power management server 102, the maintenance target image processing apparatus 103 displays, on the operation unit 325, information indicating that maintenance can start, and transits to a maintenance mode. In step S504, in the image processing apparatus 103, the maintenance executor removes a connection cable from the LAN I/F 308 based on display of the operation unit 325, thereby interrupting communication. Note that although the maintenance executor removes the cable in this embodiment, the maintenance target image processing apparatus 103 may stop the function of the LAN I/F 308 in step S504. In this case, it is desirable to simultaneously notify the operation unit 325 that the LAN connection has been disconnected.

In step S505, upon receiving a maintenance operation instruction from the maintenance executor, the operation unit 325 notifies the main controller 326 of the maintenance operation instruction. Upon receiving the maintenance operation instruction, the main controller 326 reads out a processing program for a maintenance operation from the ROM 303, and causes the CPU 301 to execute processing. In step S506, the main controller 326 of the image processing apparatus 103 determines whether maintenance is complete. Completion of maintenance is determined when the operation unit 325 that has accepted the end of maintenance from the maintenance executor sends an end notification to the main controller 326. If the main controller 326 determines that maintenance is complete, it causes the process to transit to step S507.

In step S507, the image processing apparatus 103 displays, on the operation unit 325, information indicating that maintenance is complete. Based on display of the operation unit 325 in step S507, the maintenance executor attaches the connection cable to the LAN I/F 308, and the image processing apparatus 103 restarts connection to the LAN 101. Note that in this embodiment, the maintenance executor attaches the cable. As described above, however, in the processing in step S504, the image processing apparatus 103 may stop the function of the LAN I/F 308. In this case, in step S507, the image processing apparatus 103 desirably restarts the function of the LAN I/F 308.

In step S508, the image processing apparatus 103 notifies the power management server 102 via the LAN 101 that the maintenance work is complete. After that, the image processing apparatus 103 ends the process. In step S516, the power management server 102 receives the maintenance completion notification from the image processing apparatus 103, and transits to a normal power monitoring/control mode. That is, assuming that the image processing apparatus 103 is operated in the normal mode, the power management server 102 recalculates the power consumption, and controls the power consumption based on the calculation result. After that, the power management server 102 ends the process.

<Management Table>

A management table when the power management server 102 recalculates power in step S513 of FIG. 5A will be described with reference to FIG. 6. Reference numeral 601 denotes a field indicating each of the image processing apparatuses 103 to 107 as power monitoring/control targets of the power management server 102; and 602, a field indicating the state of each image processing apparatus indicated by the field 601. The field 602 indicates that the apparatus is in a maintenance state or normal active state. Reference numeral 603 denotes a field indicating the maximum power consumption of each image processing apparatus.

In the management table of FIG. 6, as denoted by reference numeral 604, apparatus A is in the maintenance state by receiving the maintenance request from the image processing apparatus 103 in step S502 described above. As denoted by reference numeral 605, in the above-described processing in step S512, the power consumption of the image processing apparatus is set at a maximum power consumption of 950 W. Reference numeral 606 denotes total maximum power consumption obtained as a result of recalculating the power consumption by the power management server 102 in step S513 described above.

As described above, the power management system according to this embodiment includes the plurality of image processing apparatuses, and the management server for managing the power consumption of the plurality of image processing apparatuses. Each image processing apparatus notifies the management server that maintenance is to be executed. Upon receiving a response from the management server, the image processing apparatus disconnects communication to start maintenance. Furthermore, upon the end of maintenance, the image processing apparatus establishes communication to notify the management server of completion of maintenance. According to the notification, the management server calculates the power consumption of the plurality of image processing apparatuses including the maintenance target image processing apparatus to be equal to or lower than the preset total power by assuming that the maintenance target image processing apparatus is operated at its maximum power consumption. Furthermore, the management server notifies the maintenance non-target image processing apparatuses of the calculation result. Upon receiving, from each maintenance non-target image processing apparatus, a notification that the maintenance non-target image processing apparatus transits to power control according to the calculation result, the management server sends a maintenance execution permission notification to the maintenance target image processing apparatus. This enables the system according to this embodiment to manage the power consumption predicted in the system in consideration of the power consumption at the time of maintenance even during service maintenance of a predetermined image processing apparatus. That is, according to this embodiment, even if any of the image processing apparatuses in the system is being maintained, it is possible to preferably prevent the upper limit of restricted used power from being exceeded.

<Second Embodiment>

Figure 7B:
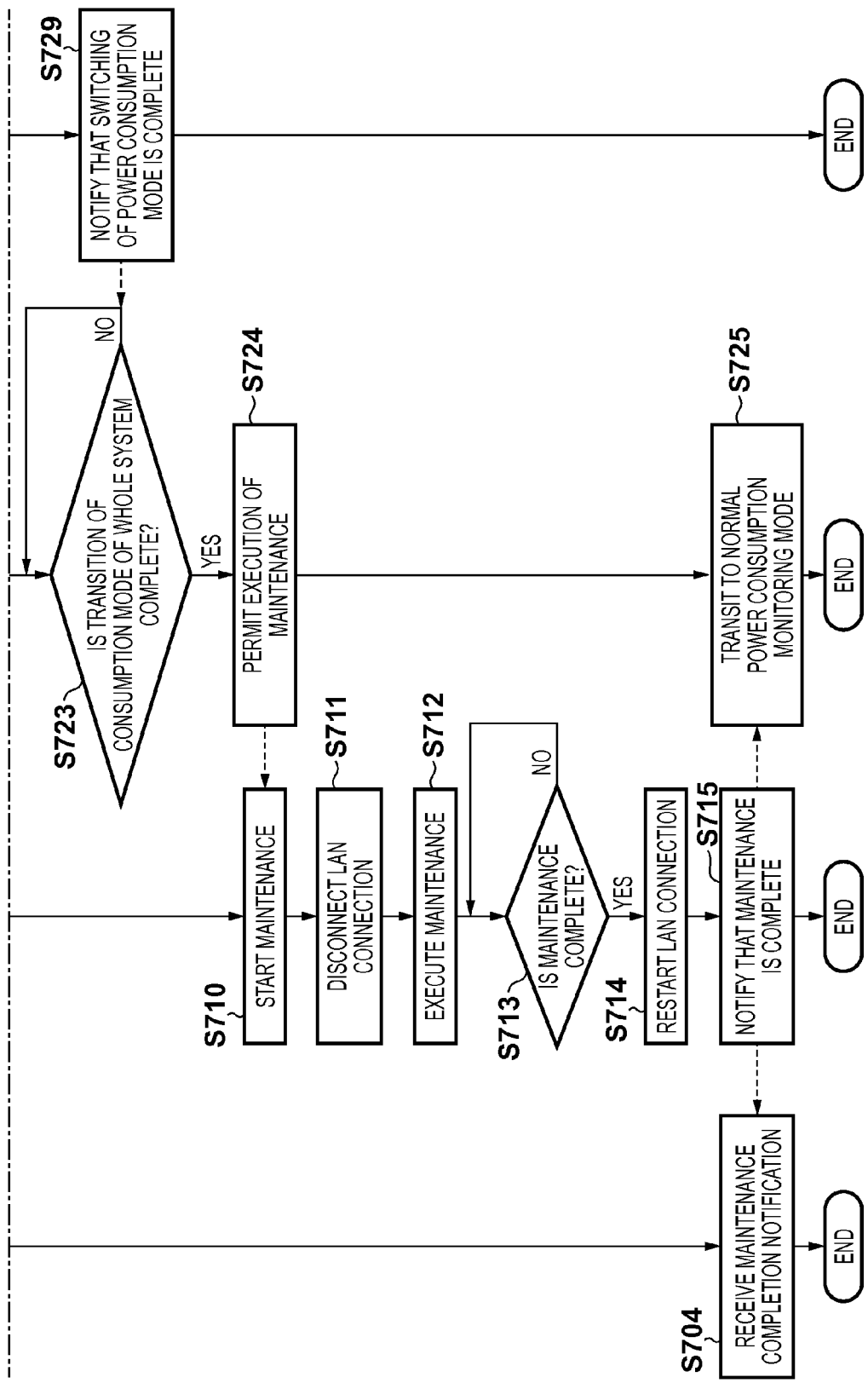
Figure 9:
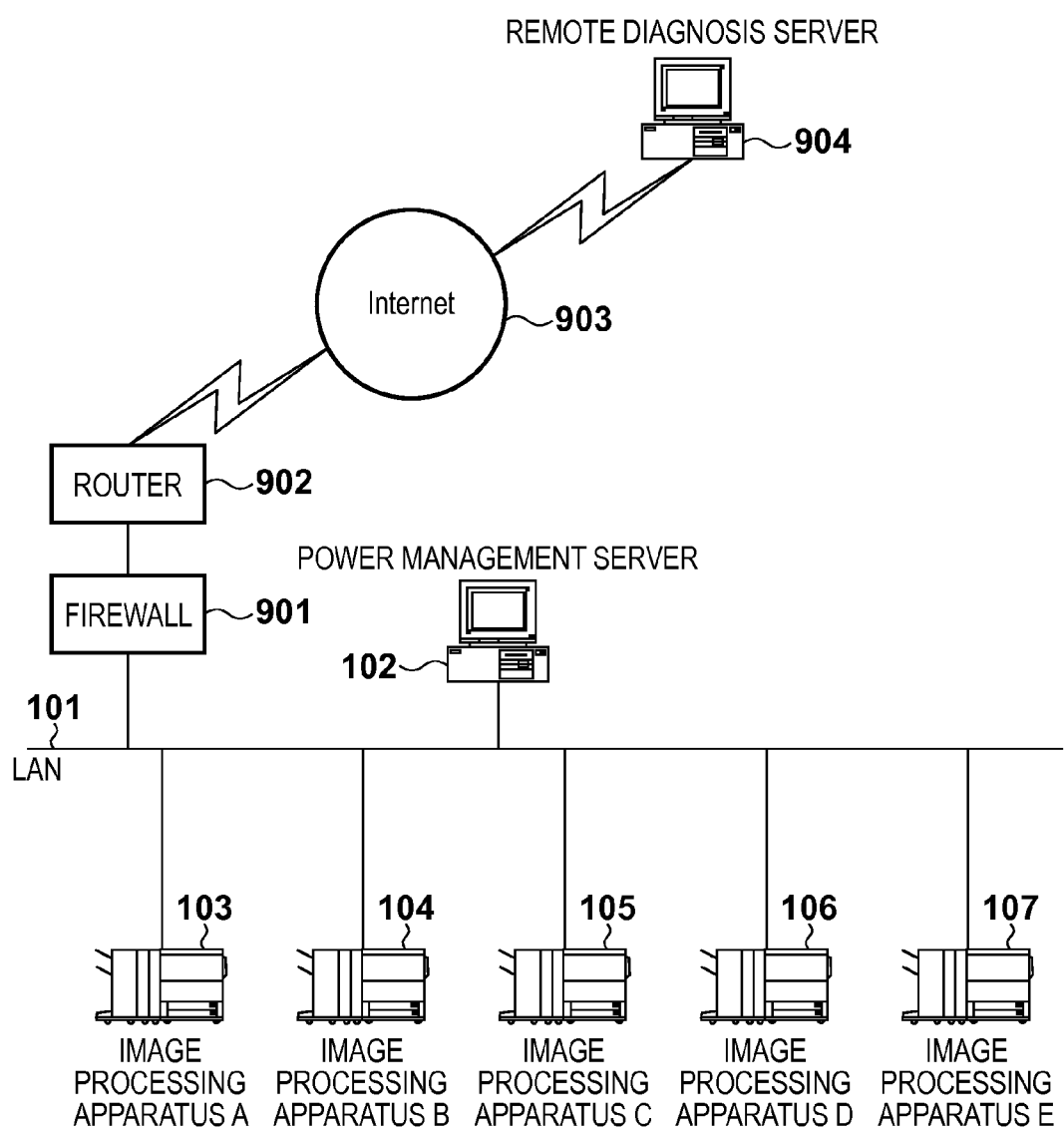
FIG. 9 is a view showing an example of connection with a remote diagnosis server according to the second embodiment.

The second embodiment of the present invention will be described below with reference to FIGS. 7 to 9. In this embodiment, a case in which power control is executed under the situation in which each of image processing apparatuses 103 to 107 periodically communicates its state with a remote diagnosis server 904. In this embodiment, it is possible to notify in advance a power management server 102 of the maintenance schedule and maintenance contents of the image processing apparatus 103 by registering them in advance in the remote diagnosis server 904. The arrangement of each image processing apparatus according to this embodiment is the same as that of each of the image processing apparatuses 103 to 107 according to the aforementioned first embodiment and only the difference of processing associated with the remote diagnosis server 904 will be explained.

<Operation Mode Change Control>

Similarly to the aforementioned first embodiment, according to this embodiment as well, each of the image processing apparatuses 103 to 107 has two power modes roughly classified into a normal power mode and power-saving mode whose power states are different from each other in accordance with the operation state of the image processing apparatus. The processing sequence of each apparatus during execution of maintenance of the image processing apparatus 103 according to this embodiment will be described with reference to FIGS. 7A and 7B. This flowchart is implemented when a CPU 301 of a main controller 326 controls a printer 328 and a scanner 327 via a power supply control unit 318 and a device I/F 312 according to programs stored in a ROM 303. The processing system of the power management server 102 performs processing as one of predetermined applications of the power management server 102. The processing system of the remote diagnosis server 904 also performs processing as one of predetermined applications of the remote diagnosis server 904.

In step S718, the power management server 102 monitors the power consumption of the plurality of power management target image processing apparatuses connected to a LAN 101, and starts and executes control processing so that the power consumption becomes equal to or lower than preset total power. In step S707, the maintenance target image processing apparatus 103 periodically transmits its apparatus state to the remote diagnosis server 904. Note that the image processing apparatus 103 may register the maintenance schedule in the power management server 102 in the processing of periodically transmitting the apparatus state, or transfer a registration notification independently of the transmission processing. In step S702, the remote diagnosis server 904 receives the state notification from the image processing apparatus 103. In step S703, if the maintenance schedule shown in FIGS. 8A and 8B (to be described later) includes the image processing apparatus 103, the remote diagnosis server 904 performs return processing by adding, as return data to the notification in step S702, schedule information and adjustment items and work items at the time of maintenance. Execution of items except for the adjustment items and work items at the time of maintenance included in the schedule information is restricted.

In step S708, the image processing apparatus 103 receives the maintenance schedule information from the remote diagnosis server 904 as the return data to the notification in step S707. In step S709, the image processing apparatus 103 performs processing of registering the maintenance schedule in the power management server 102 via the LAN 101. In step S719, the power management server 102 receives the maintenance schedule notified from the image processing apparatus 103.

In step S720, the power management server 102 determines whether the maintenance date/time of the image processing apparatus 103 received in step S719 has been reached. If the power management server 102 determines in step S720 that the maintenance date/time of the image processing apparatus 103 has been reached, the process transits to step S721. After that, in consideration of the adjustment items and work items at the time of maintenance, the power management server 102 calculates the maximum power consumption during the maintenance work, and registers it as the power consumption during execution of maintenance of the image processing apparatus 103 in the management table. In step S722, the power management server recalculates the power consumption of the management target image processing apparatuses 103 to 107 based on the recognition in step S721. Based on the recalculation result, the power management server 102 issues a power control instruction to the plurality of image processing apparatuses 104 to 107 that are not maintenance targets but power management targets so that the power consumption of the image processing apparatuses including the maintenance target image processing apparatus 103 becomes equal to or lower than the preset total power.

In step S728, each of the maintenance non-target mage processing apparatuses 104 to 107 receives the power control instruction issued in step S722, and performs processing of switching the power consumption mode of its own. In step S729, each of the maintenance non-target image processing apparatuses 104 to 107 notifies the power management server 102 that switching of the power consumption is complete. After that, each of the maintenance non-target image processing apparatuses 104 to 107 ends the process.

In step S723, the power management server 102 stands by for the power consumption mode switching completion notification, based on the power control instruction issued in step S722, of each of the maintenance non-target image processing apparatuses 104 to 107. Upon completion of transition of the power consumption mode of the whole system, the power management server 102 causes the process to transit to step S724. In step S724, the power management server 102 sends a maintenance execution permission notification to the maintenance target image processing apparatus 103.

In step S710, upon receiving the maintenance execution permission notification from the power management server 102, the maintenance target image processing apparatus 103 displays, on an operation unit 325, information indicating that maintenance can start, and transits to a maintenance mode. In step S711, in the image processing apparatus 103, the maintenance executor removes a connection cable from a LAN I/F 308 based on display of the operation unit 325, thereby interrupting communication. Note that although the maintenance executor removes the cable in this embodiment, the maintenance target image processing apparatus 103 may stop the function of the LAN I/F 308 in step S711. In this case, it is desirable to simultaneously notify the operation unit 325 that the LAN connection has been disconnected.

In step S712, upon receiving a maintenance operation instruction from the maintenance executor, the operation unit 325 notifies the main controller 326 of the maintenance operation instruction. Upon receiving the maintenance operation instruction, the main controller 326 reads out a processing program for a maintenance operation from the ROM 303, and causes the CPU 301 to execute processing. Note that upon receiving the maintenance operation instruction, the main controller 326 determines whether the instruction is an instruction for an item except for the adjustment items and work items at the time of maintenance which have been registered in the power management server 102 in step S709 described above. If the main controller 326 determines that the instruction is an instruction for an item except for the adjustment items and work items at the time of maintenance, it displays, on the operation unit 325, information indicating that the instructed work is not executable so as not to allow an unexpected power consumption status. That is, the main controller 326 displays, on the operation unit 325, a state in which some maintenance adjustment items are restricted.

In step S713, the main controller 326 of the image processing apparatus 103 determines whether maintenance is complete. Completion of maintenance is determined when the operation unit 325 that has accepted the end of maintenance from the maintenance executer sends an end notification to the main controller 326. If the main controller 326 determines that maintenance is complete, it causes the process to transit to step S714. In step S714, the image processing apparatus 103 displays, on the operation unit 325, information indicating that maintenance is complete. Based on display of the operation unit 325 in step S714, the maintenance executor attaches the connection cable to the LAN I/F 308, and the image processing apparatus 103 restarts connection to the LAN 101. Note that in this embodiment, the maintenance executor attaches the cable. As described above, however, in the processing in step S711, the image processing apparatus 103 may stop the function of the LAN I/F 308. In this case, in step S714, the image processing apparatus 103 desirably restarts the function of the LAN I/F 308.

In step S715, the image processing apparatus 103 notifies the power management server 102 and remote diagnosis server 904 via the LAN 101 that the maintenance work is complete. After that, the image processing apparatus 103 ends the process. In step S725, the power management server 102 receives the maintenance completion notification from the image processing apparatus 103, and performs processing of deleting the schedule information of the image processing apparatus 103 from the schedule information received in step S719 while transiting to a normal power monitoring/control mode. After that, the power management server 102 causes the process to transit to step S726, thereby completing the process. On the other hand, the remote diagnosis server 904 receives the maintenance completion notification from the image processing apparatus 103 in step S704, and deletes the image processing apparatus 103 from the maintenance/schedule targets exemplified in FIGS. 8A and 8B, thereby ending the process.

<Maintenance Schedule Information>

Maintenance schedule information added as return data by the remote diagnosis server 904 in step S703 of FIG. 7A described above in response to reception from the image processing apparatus 103 in step S702 will be described with reference to FIGS. 8A and 8B. Reference numeral 801 denotes unique number information for uniquely identifying a device, such as a serial number uniquely assigned to each image processing apparatus as a state management target of the remote diagnosis server 904; and 802 and 803, a date and time when the device maintenance executor will visit the device installation location for the image processing apparatus indicated by the unique number information 801. Pieces 800 and 810 of maintenance schedule information indicate pieces of date/time information different for the respective devices. Note that the device of the maintenance schedule information 810 includes no deck or finisher.

Reference numeral 804 denotes a field indicating an energized point controllable by the power control unit of the image processing apparatus; and 805, a field indicating used power corresponding to the energized point. The energized point and its corresponding used power are different depending on the model (for example, color device or monochrome device), print speed, scan speed, fixing method (roller fixing or on-demand fixing) of the image processing apparatus, and are also different depending on an option mounting status even for the same model.

Reference numeral 806 denotes a field indicating each of all maintenance items of the image processing apparatus indicated by the unique number information 801; 807, adjustment and work items of the image processing apparatus for which the maintenance executer executes work when he/she visits on the date 802. A symbol "◯" indicates that the corresponding item is included as a work item, and "x" indicates that the corresponding item is not included as a work item. When executing maintenance of the image processing apparatus, it is not necessary to always perform all the adjustment and work items. Therefore, as shown in FIGS. 8A and 8B, it is possible to decide in advance work items to be executed when the maintenance executor visits this time among a number of maintenance menus.

Reference numeral 808 denotes a field indicating whether it is necessary to simultaneously operate the energized points indicated by the field 804 with respect to each adjustment item. For example, for adjustment of the image quality of the copy function, there are an adjustment item for which the scan operation and the print operation are synchronously performed at the same time and an item adjustable by asynchronously performing the scan operation and print operation. When executing maintenance with respect to an adjustment item requiring a synchronous operation, the peak of the power consumption as the maximum power consumption becomes higher as compared with adjustment by an asynchronous operation.

Reference numeral 809 denotes a field indicating maximum power consumption required to perform each adjustment item. The image processing apparatus 103 prohibits an operation except for the adjustment items indicated by the field 806 at the time of execution of maintenance in step S712 described above, thereby allowing protection so as not to lead to unexpected power consumption. At the time of calculation of the power consumption in step S721 described above, the power management server 102 performs calculation according to the fields 806 and 809.

<Arrangement Relationship>

The arrangement relationship between the remote diagnosis server 904, power management server 102, and image processing apparatuses 103 to 107 will be described with reference to FIG. 9. The components 101 to 107 are the same as those described with reference to FIG. 1 and a description thereof will be omitted.

Reference numeral 901 denotes a firewall connected to the LAN 101 and a router 902. The firewall 901 is an apparatus for preventing intrusion from the outside to the computer network of the LAN 101 via the Internet 903 in FIG. 9. The router 902 interconnects different networks. The Internet 903 is an external network. The remote diagnosis server 904 communicates, via the external network such as the Internet 903, with the image processing apparatus connected to the LAN 101.

In the above-described arrangement in which the firewall exists, the remote diagnosis server 904 cannot directly transmit data to the image processing apparatus on the LAN 101. Therefore, the image processing apparatus transmits data necessary for remote diagnosis to the remote diagnosis server 904 at regular intervals. TCP/IP data transmission requires an ACK response for reception acknowledgement. By adding, to the ACK response data, data to be sent from the remote diagnosis server 904 to the image processing apparatus connected to the LAN 101, it is possible to send the maintenance schedule information described in this embodiment. The remote diagnosis server 904 is connected to not only devices on a single network indicated by the LAN 101 but also a plurality of different computer networks (not shown).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-248335 filed on Nov. 29, 2013, which is hereby incorporated by reference herein in its entirety.

What is claimed is:

1. A power management system including (a) a plurality of image processing apparatuses and (b) a management server configured to manage power consumption of the plurality of image processing apparatuses,
    each of the plurality of image processing apparatuses comprising a processor, wherein the processor functions as units comprising:
        (1) a notification unit configured to notify the management server that maintenance is to be executed; and
        (2) an execution unit configured to, upon receiving, from the management server, a response to the notification by the notification unit, disconnect communication to start maintenance, and to, upon an end of the maintenance, establish communication to notify the management server of completion of the maintenance, and the management server comprising a processor, wherein the processor functions as units comprising:
        (1) a calculation unit configured to calculate, according to the notification by the notification unit, the power consumption of the plurality of image processing apparatuses including a maintenance target image processing apparatus so as not to be higher than a preset total power by assuming that the maintenance target image processing apparatus is operated at maximum power consumption of the image processing apparatus; and
        (2) a control unit configured to notify a maintenance non-target image processing apparatus of a calculation result of the calculation unit, and upon receiving, from the maintenance non-target image processing apparatus, a notification that the maintenance non-target image processing apparatus has transited to power control according to the calculation result, send, to the maintenance target image processing apparatus, a permission notification for permitting the maintenance target image processing apparatus to execute the maintenance, as a response to the notification by the notification unit.

2. The power management system according to claim 1, wherein upon receiving the maintenance completion notification from the execution unit, the calculation unit calculates the power consumption of the plurality of image processing apparatuses by assuming that the maintenance target image processing apparatus is operated in a normal mode.

3. The power management system according to claim 1, wherein upon receiving the notification of the calculation result from the control unit, the maintenance non-target image processing apparatus switches a power consumption mode according to the calculation result, and
    wherein upon completion of switching, the maintenance non-target image processing apparatus notifies the management server that the maintenance non-target image processing apparatus has transited to power control according to the calculation result.

4. The power management system according to claim 1, wherein the management server further includes a management table configured to manage the power consumption of the plurality of image processing apparatuses and an operation mode indicating one of a normal mode and a maintenance mode.

5. The power management system according to claim 1, further comprising a remote diagnosis server configured to periodically receive notifications of a state by each of the plurality of image processing apparatuses, and to transmit a maintenance schedule to the maintenance target image processing apparatus,
    wherein, for each of the plurality of image processing apparatuses, the respective processor further functions as a registration unit configured to periodically notify the remote diagnosis server of the state, and register the maintenance schedule, and
    wherein the remote diagnosis server notifies in advance, via the maintenance target image processing apparatus, the management server of the maintenance schedule of the image processing apparatus as a response to the state notification periodically notified from the image processing apparatus.

6. The power management system according to claim 5, wherein the calculation unit calculates the power consumption of the plurality of image processing apparatuses based on the maintenance schedule.

7. The power management system according to claim 5, wherein the maintenance schedule includes information about a unique number for identifying each image processing apparatus, a maintenance date/time, an energized point included in the image processing apparatus, used power of the energized point, an adjustment item, and maximum power consumption necessary for executing maintenance of the adjustment item.

8. The power management system according to claim 7, wherein, for each of the plurality of image processing apparatuses, the respective processor further functions as a restriction unit configured to restrict an operation except for the adjustment item included in the maintenance schedule.

9. The power management system according to claim 8, wherein, for each of the plurality of image processing apparatuses, the respective processor further functions as an operation unit, and
wherein when the image processing apparatus is the maintenance target image processing apparatus, a state in which the restriction unit restricts some maintenance adjustment items is displayed by the operation unit.

10. The power management system according to claim 8, wherein, for each of the plurality of image processing apparatuses, the respective processor further functions as an operation unit, and
wherein when the image processing apparatus is the maintenance non-target image processing apparatus, information indicating that power control is performed for maintenance of the maintenance target image processing apparatus is displayed by the operation unit.

11. An image processing apparatus communicable with a management server configured to manage power consumption of a connected device, the image processing apparatus comprising a processor, wherein the processor functions as units comprising:
a notification unit configured to notify the management server that maintenance is to be executed; and
an execution unit configured to, upon receiving, from the management server, a response to the notification by the notification unit, disconnect communication to start maintenance, and to, upon end of the maintenance, establish communication to notify the management server of completion of the maintenance,
wherein the response includes, as a calculation result, the power consumption of a plurality of image processing apparatuses including a maintenance target image processing apparatus, the power consumption being calculated according to the notification by the notification unit, so as not to be higher than a preset total power by assuming that the maintenance target image processing apparatus is operated at maximum power consumption of the image processing apparatus, and
wherein the calculation result is sent to a maintenance non-target image processing apparatus, and upon the management server receiving, from the maintenance non-target image processing apparatus, a notification that the maintenance non-target image processing apparatus has transited to power control according to the calculation result, a permission notification for permitting the maintenance target image processing apparatus to execute the maintenance is sent to the maintenance target image processing apparatus.

12. A management server for managing power consumption of a plurality of image processing apparatuses, the management server comprising a processor, wherein the processor functions as units comprising:
a calculation unit configured to calculate, according to a notification that maintenance is to be executed from one of the plurality of image processing apparatuses, the power consumption of the plurality of image processing apparatuses including a maintenance target image processing apparatus so as not to be higher than a preset total power by assuming that the maintenance target image processing apparatus is operated at maximum power consumption of the image processing apparatus; and
a control unit configured to notify a maintenance non-target image processing apparatus of a calculation result of the calculation unit, and upon receiving, from the maintenance non-target image processing apparatus, a notification that the maintenance non-target image processing apparatus has transited to power control according to the calculation result, send to the maintenance target image processing apparatus, a permission notification for permitting the maintenance target image processing apparatus to execute the maintenance, as a response to the notification.

13. A control method for a power management system including (a) a plurality of image processing apparatuses and (b) a management server configured to manage power consumption of the plurality of image processing apparatuses,
each of the plurality of image processing apparatuses executing:
(1) causing a notification unit to notify the management server that maintenance is to be executed, and
(2) causing an execution unit to, upon receiving, from the management server, a response to the notification by the notification unit, disconnect communication to start maintenance, and to upon end of the maintenance, establish communication to notify the management server of completion of the maintenance, and
the management server executing:
(1) calculating, according to the notification by the notification unit, the power consumption of the plurality of image processing apparatuses including a maintenance target image processing apparatus so as not to be higher than a preset total power by assuming that the maintenance target image processing apparatus is operated at maximum power consumption of the image processing apparatus, and
(2) notifying a maintenance non-target image processing apparatus of a calculation result in the calculating, and
(3) upon receiving, from the maintenance non-target image processing apparatus, a notification that the maintenance non-target image processing apparatus has transited to power control according to the calculation result, sending, to the maintenance target image processing apparatus, a permission notification for permitting the maintenance target image processing apparatus to execute the maintenance, as a response to the notification.

14. A control method for an image processing apparatus communicable with a management server configured to manage power consumption of a connected device, the control method comprising:
notifying the management server that maintenance is to be executed; and
disconnecting, upon receiving, from the management server, a response to the notification, communication to start maintenance, and establishing, upon end of the maintenance, communication to notify the management server of completion of the maintenance, wherein the response includes, as a calculation result, the power consumption of a plurality of image processing apparatuses including a maintenance target image processing apparatus, the power consumption being calculated according to the notification by the notification unit, so as not to be higher than a preset total power by assuming that the maintenance target image processing apparatus is operated at maximum power consumption of the image processing apparatus, and wherein the calculation result is sent to a maintenance non-target image processing apparatus, and upon the management server receiving, from the maintenance non-target image processing apparatus, a notification that the maintenance non-target image processing apparatus has transited to power control according to the calculation result, a permission notification for permitting the maintenance target image processing apparatus to execute the maintenance is sent to the maintenance target image processing apparatus.

15. A control method for a management server configured to manage power consumption of a plurality of image processing apparatuses, the control method comprising:

calculating, according to a notification that maintenance is to be executed from one of the plurality of image processing apparatuses, the power consumption of the plurality of image processing apparatuses including a maintenance target image processing apparatus so as not to be higher than a preset total power by assuming that the maintenance target image processing apparatus is operated at maximum power consumption of the image processing apparatus; and notifying a maintenance non-target image processing apparatus of a calculation result in the calculating, and upon receiving, from the maintenance non-target image processing apparatus, a notification that the maintenance non-target image processing apparatus has transited to power control according to the calculation result, sending, to the maintenance target image processing apparatus, a permission notification for permitting the maintenance target image processing apparatus to execute the maintenance, as a response to the notification.

16. A non-transitory computer-readable storage medium storing a computer program for causing a computer to execute a method of controlling an image processing apparatus communicable with a management server configured to manage power consumption of a connected device, the method comprising:

notifying the management server that maintenance is to be executed; and disconnecting, upon receiving, from the management server, a response to the notification, communication to start maintenance, and establishing, upon end of the maintenance, communication to notify the management server of completion of the maintenance, wherein the response includes, as a calculation result, the power consumption of a plurality of image processing apparatuses including a maintenance target image processing apparatus, the power consumption being calculated according to the notification, so as not to be higher than a preset total power by assuming that the maintenance target image processing apparatus is operated at maximum power consumption of the image processing apparatus, wherein the calculation result is sent to a maintenance non-target image processing apparatus, and upon the management server receiving, from the maintenance non-target image processing apparatus, a notification that the maintenance non-target image processing apparatus has transited to power control according to the calculation result, a permission notification for permitting the maintenance target image processing apparatus to execute the maintenance is sent to the maintenance target image processing apparatus.

17. A non-transitory computer-readable storage medium storing a computer program for causing a computer to execute a method of controlling an management server configured to manage power consumption of a plurality of image processing apparatuses, the method comprising:

calculating, according to a notification that maintenance is to be executed from one of the plurality of image processing apparatuses, the power consumption of the plurality of image processing apparatuses including a maintenance target image processing apparatus so as not to be higher than a preset total power by assuming that the maintenance target image processing apparatus is operated at maximum power consumption of the image processing apparatus; and notifying a maintenance non-target image processing apparatus of a calculation result in the calculating, and upon receiving, from the maintenance non-target image processing apparatus, a notification that the maintenance non-target image processing apparatus has transited to power control according to the calculation result, sending, to the maintenance target image processing apparatus, a permission notification for permitting the maintenance target image processing apparatus to execute the maintenance, as a response to the notification.

* * * * *